March 31, 1931. H. B. CHALMERS 1,798,722
VARIABLE SPEED TRANSMISSION
Filed Feb. 6, 1924  2 Sheets-Sheet 2
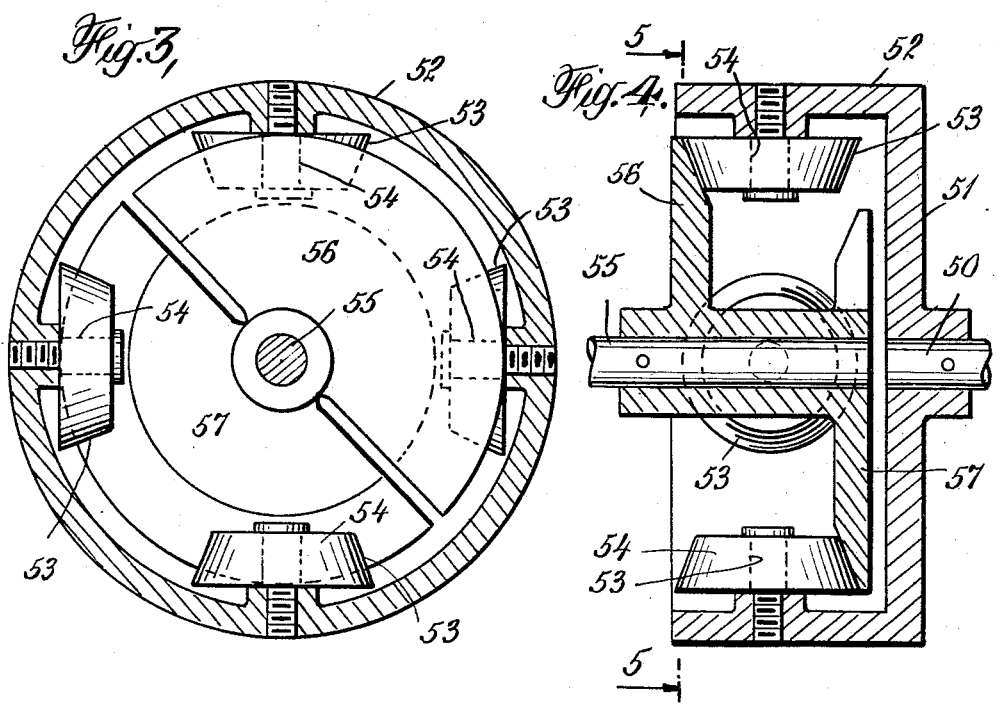
INVENTOR
Harry B. Chalmers
BY
E. W. Marshall
ATTORNEY Patented Mar. 31, 1931

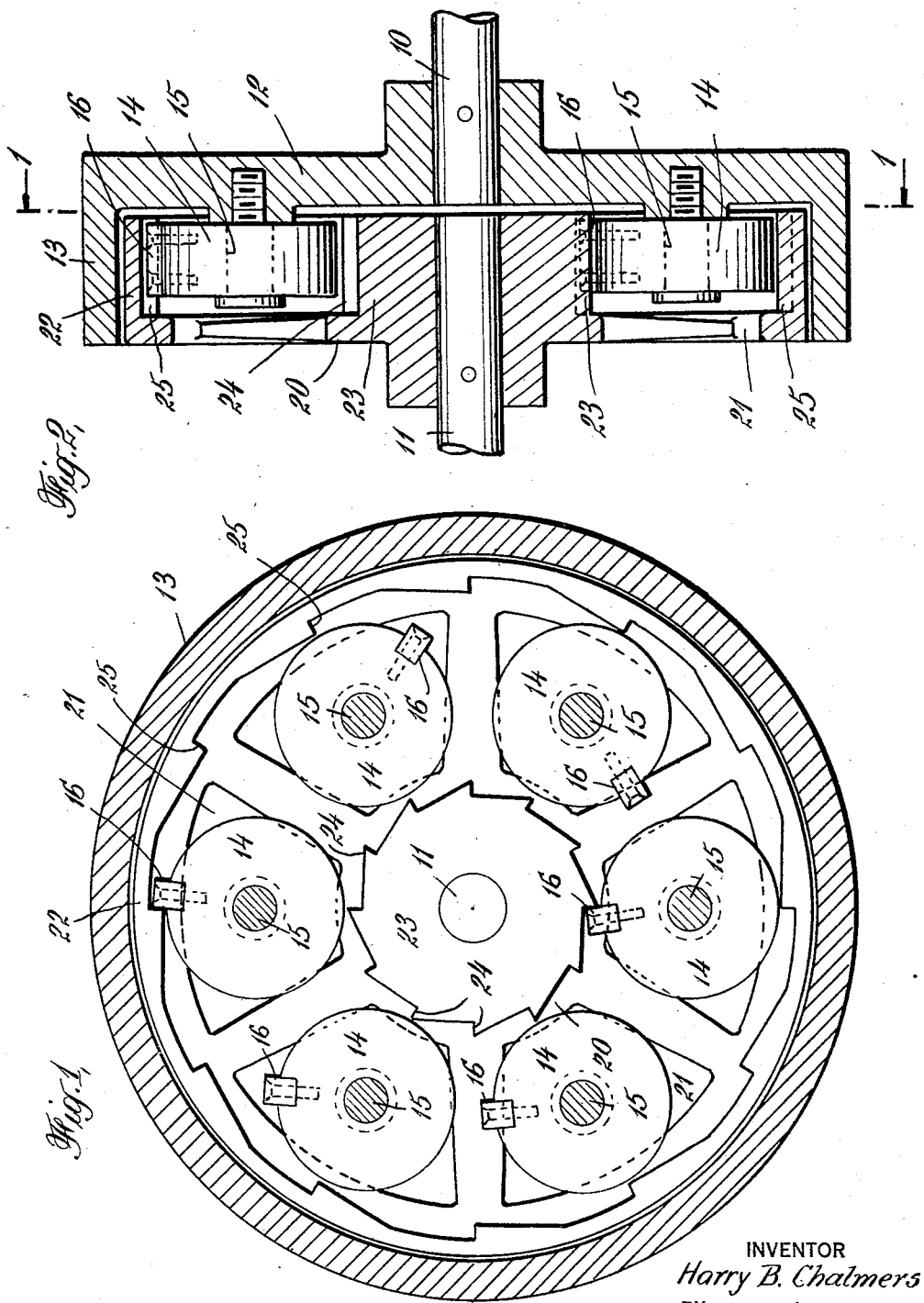

1,798,722

UNITED STATES PATENT OFFICE

HARRY B. CHALMERS, OF NEW YORK, N. Y.

VARIABLE-SPEED TRANSMISSION

Application filed February 6, 1924. Serial No. 690,925.

This invention relates to variable speed power transmission mechanism.

As is well known most change speed mechanisms provide for a limited number of speed changes and in changing from one speed to another speed the driving effort is lost. Furthermore the majority of such devices require the manipulation of a shift lever or similar device to change the speed and such manipulation involves considerable skill since certain gears are thrown out of mesh and other gears are thrown into mesh.

This invention has for its salient object to provide mechanism of the class described by means of which the torque or stress in the driven mechanism will increase in substantially inverse ratio to its speed and in substantially direct ratio to the speed of the driving mechanism.

Another object of the invention is to provide variable speed or change speed mechanism so constructed and arranged that an infinite variety of speeds from zero to maximum can be obtained.

Another object of the invention is to provide mechanism of the character described so constructed and arranged that the torque of the driven member will be increased automatically as the load increases and the speed of the driven member will be automatically decreased as the load increases.

Further objects of the invention will appear from the following description taken in connection with the drawings which form a part of this application and in which, Fig. 1 is a sectional elevation of one form of mechanism constructed in accordance with the invention and taken substantially on line 1—1 of Fig. 2.

Fig. 2 is a transverse sectional elevation of the construction shown in Fig. 1.

Fig. 3 is a sectional elevation of another form of mechanism constructed in accordance with the invention and taken substantially on line 5—5 of Fig. 4, and Fig. 4 is a transverse sectional elevation of the construction shown in Fig. 3.

The invention briefly described comprises a driving element, a driven element, and power transmitting means between said elements and so constructed and arranged that the power is transmitted from the driving to the driven element through a multiplicity of impulses. In the particular forms of the invention shown the driving element has mounted thereon a plurality of pivoted elements adapted to rotate with the driving element and to impart to the driven element impulses or blows thereby effecting a continuous drive of the driven element. Further details of the invention will appear from the following description.

In the embodiment of the invention shown in Figs. 1 and 2 the shaft 10 represents the driving member and may be connected to any suitable source of power and the shaft 11 represents the driven member.

The shaft 10 has fixedly mounted thereon a disc 12 having a flange 13 which forms an enclosing casing or cover for the transmission mechanism. The disc and flange also act as a fly wheel.

The disc 12 has concentrically mounted thereon a plurality of substantially cylindrical weights or masses 14, these elements being freely rotatable on their pivot studs 15. Each of the elements 14 has secured to its periphery an outwardly projecting lug 16, which may be formed of rubber or other suitable material.

The driven shaft 11 has mounted thereon a disc 20 preferably cut away as shown in 21 to lighten the disc and save material and the disc 21 has formed on its outer periphery a laterally projecting flange 22. The disc 21 also has a hub 23 provided on its outer periphery with ratchet teeth 24. Flange 22 has formed thereon internal ratchet teeth 25.

As shown in Fig. 2 when the parts are assembled the cylindrical weights or masses 14 are disposed between the two sets of ratchet teeth carried by the disc 20.

The structure shown in Figs. 1 and 2 operates as follows. As the driving element 10 and disc 12 are rotated the cylindrical masses or weights 14 will also be rotated with the disc about the axis of the driving shaft as a center. As these masses rotate around the hub 23 of the disc 20 carried by the driven shaft 11 the lugs 16 will engage the teeth 24 on the hub whereupon the cylindrical weights will swing on their pivots 15. As the lugs 16 swing they will engage the internal ratchet teeth 25 thereby giving an impulse or blow to the disc 20. In the rebound the disc will swing to cause the lug 16 to engage the teeth 24 giving another impulse. The disc will thus continue to vibrate between the ratchet teeth 24 and 25. These impulses will be continuing as the driving element rotates and therefore continuing impulses will be given to the driven element thus causing rotation thereof. It will be obvious that as the speed of the driving element increases, the strength and number of the impulses increase and thus the sum of the speed and the torque of the driven element will also be increased and vice versa.

Figs. 3 and 4 illustrate another form of the invention. In this embodiment the driving shaft 50 has secured thereto a disc 51 having a peripheral flange 52. The flange 52 has mounted thereon a plurality of beveled discs 53, the axes 54 of these discs being disposed at right angles to the driving member and radially with respect thereto.

The driven shaft 55 has fixedly mounted thereon a pair of segmental discs 56 and 57, these discs being longitudinally spaced from each other as clearly shown in Fig. 4. The disc 57 is adapted to engage the beveled surfaces of the discs 53 at one side of the axes thereof and the disc 56 is adapted to engage the same beveled surfaces at the opposite side of the axes thereof. In this construction during one half of a revolution of the driving shaft and disc 51 the discs or masses 53 will be engaged by the disc 57 thereby causing the masses 53 to rotate in one direction. During the other half of the revolution the masses 53 will impart this rotation to the other segmental disc 56 thereby causing this disc to rotate and driving the driven shaft and vice versa. The speed of rotation of the discs or masses 53 will be determined by the speed of rotation of the driving member and will in turn determine the sum of speed of rotation and torque of the driven member.

It will be obvious that in the forms of the invention shown in Figs. 1, 2, 3 and 4 the driven element can be made to drive the driving element if power is applied to the driven shaft 11.

From the foregoing specification it will be seen that simple, practical and effective means have been provided for automatically transmitting power from a driving element to a driven element. The number and power of impulses or blows by means of which the power is transmitted are limited only by the power available. Furthermore a great variety of speed changes can be obtained and the speed of the driven element automatically adjusts itself to properly carry the load on the driven member.

Although the variable speed mechanism above described is particularly adapted for motor vehicle use it will be obvious that it is capable of general application such as use on stationary drives of many varieties.

Although certain specific embodiments of the invention have been specifically illustrated and described it will be understood that the invention is capable of modification and that further changes in the construction and in the arrangement of the various cooperating parts may be made without departing from the spirit or scope of the invention as expressed in the following claims.

What I claim is:

1. Transmission mechanism comprising a rotatable driving member, a number of rotatable masses carried thereby with their axes at fixed distances from the axis of said rotatable member, each mass being rotatable about its own axis through at least 180°, a driven member having a portion supported between said masses and means intermittently operated upon by the inertia of said masses as they rotate first in one direction and then in the opposite direction to transmit force from the driving to the driven member.

2. Power transmission mechanism comprising a rotatable driving member, a rotatable driven member, and means for creating unidirectional torque from the driving to the driven member including a series of bearings carried by one member eccentric of its axis, inertia masses rotatably mounted on said bearings, and means of connection between the masses and the other member including means carried by the other member for intermittently engaging and acting upon said masses to vary their velocity in proportion to the differences in speed of rotation of the driving and driven members, means engaged by the masses to rotate the driven member.

3. Power transmission mechanism comprising a rotatable driving member, a rotatable driven member, and means for creating unidirectional torque from the driving to the driven member including a series of bearings carried by one member eccentric of its axis, inertia masses rotatably mounted on said bearings, and means of connection between the masses and the other member including means carried by the other member for engaging and acting upon said masses to rotate them on their axes first in one direction and then in the other direction and to vary their velocity in approximate proportion to the differences in speed of rotation of the driving and driven members, and means engaged by the masses to rotate the driven member.

4. Transmission mechanism comprising a rotatable driving member, a number of pivot shafts carried thereby, a mass pivoted on each shaft, a driven member having a hub mounted interiorly of the paths of said masses and driving means of connection between said masses and said driven member to intermittently apply rotating force to said masses first in one direction and then in the opposite direction, said masses remaining at a fixed distance from the axis of the driven member.

5. Power transmission mechanism comprising a rotatable driving member, a rotatable driven member and means for creating substantially unidirectional torque from the driving to the driven member including a friction member rotatable with the driven member and a number of rotatable friction inertia masses having means of connection with the driving member and adapted to intermittently engage the friction member which is rotatable with the driven member, said inertia masses being rotatable with the driving member, each inertia mass being rotatable through more than 180° on its own axis.

In witness whereof, I have hereunto set my hand this 19th day of December, 1923.

HARRY B. CHALMERS.